US012147846B2

(12) United States Patent
Lo et al.

(10) Patent No.: US 12,147,846 B2
(45) Date of Patent: Nov. 19, 2024

(54) CLUSTERED CONTAINER PROTECTION

(71) Applicant: International Business Machines Corporation, Armonk, NY (US)

(72) Inventors: Yun-Chang Lo, Taipei (TW); Chun-Shuo Lin, Tainan (TW); Chih-Wei Hsiao, Taipei (TW); Wei-Hsiang Hsiung, Taipei (TW); Wei-Jie Liau, Taoyuan (TW)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 17/643,864

(22) Filed: Dec. 13, 2021

(65) Prior Publication Data

US 2023/0185628 A1 Jun. 15, 2023

(51) Int. Cl.
*G06F 9/50* (2006.01)
*G06F 9/38* (2018.01)
*G06F 9/455* (2018.01)

(52) U.S. Cl.
CPC .......... *G06F 9/5077* (2013.01); *G06F 9/3891* (2013.01); *G06F 9/45558* (2013.01); *G06F 2009/45595* (2013.01)

(58) Field of Classification Search
None
See application file for complete search history.

(56) References Cited

U.S. PATENT DOCUMENTS 10,546,121 B2   1/2020  Brech
10,698,925 B1*  6/2020  Zhao ............... G06F 9/455
10,824,726 B1* 11/2020  Herman Saffar ..... G06F 21/566
10,902,118 B2   1/2021  Krylov
2017/0098072 A1  4/2017  Stopel
2017/0116415 A1  4/2017  Stopel
2019/0163559 A1*  5/2019  Takahashi ........... G06F 11/0793
(Continued)

FOREIGN PATENT DOCUMENTS

CN  110851241 A  2/2020
GB  2568965 A  6/2019

OTHER PUBLICATIONS

Zou, Zhuping, Yulai Xie, Kai Huang, Gongming Xu, Dan Feng, and Darrell Long. "A docker container anomaly monitoring system based on optimized isolation forest." IEEE Transactions on Cloud Computing 10, No. 1 (2019): 134-145. (Year: 2019).*

(Continued)

*Primary Examiner* — Frank D Mills
(74) *Attorney, Agent, or Firm* — Randy Tejeda

(57) ABSTRACT

One or more computer processors determine a runtime feature set for a first container, wherein the runtime feature set includes aggregated temporally collocated container behavior. The one or more computer processors cluster the first container with one or more peer containers or peer pods based on a shared container purpose, similar container behaviors, and similar container file structure. The one or more computer processors determine an additional runtime feature set for each peer container. The one or more computer processors calculate a variance between the first container and each peer container. The one or more computer processors, responsive to the calculated variance exceeding a variance threshold, identify the first container as anomalous.

20 Claims, 3 Drawing Sheets

(56) References Cited

U.S. PATENT DOCUMENTS

| | | | |
|---|---|---|---|
| 2019/0163901 | A1 | 5/2019 | Tien |
| 2019/0296963 | A1* | 9/2019 | Bonnell ............. H04L 41/0622 |
| 2020/0233961 | A1 | 7/2020 | Wolfin |
| 2021/0112017 | A1* | 4/2021 | Gupta .................... H04L 45/24 |
| 2021/0132974 | A1 | 5/2021 | Watt, Jr. |
| 2021/0211408 | A1 | 7/2021 | Porras |
| 2023/0169168 | A1* | 6/2023 | Magen Medina .. G06F 9/45558 726/23 |

OTHER PUBLICATIONS

Samir, Areeg, Nabil El Ioini, Ilenia Fronza, Hamid R. Barzegar, Van Thanh Le, and Claus Pahl. "Anomaly detection and analysis for reliability management clustered container architectures." International Journal on Advances in Systems and Measurements 12, No. 3 (2020): 247-264. (Year: 2020).*

International Search Report and Written Opinion for Application No. PCT/CN2022/134071, Jan. 11, 2023, 9 pgs.

"Sysdig Introduces Runtime Profiling and Anomaly Detection with Machine Learning to Secure Kubernetes Environments at Scale", Aug. 6, 2019, 5 pages, <https://sysdig.com/press-releases/sysdig-introduces-runtime-profiling-and-anomaly-detection-with-machine-learning-to-secure-kubernetes-environments-at-scale/>.

Alsallal, Mutaz, "Threat Hunting in Containers", Oct. 2, 2019, 8 pages, <https://community.ibm.com/community/user/security/blogs/mutaz-alsallal1/2019/10/02/threat-hunting-in-containers>.

K, Yusuf, "Container security with Sysdig Falco", Nov. 28, 2018, 4 pages, <https://www.infracloud.io/blogs/container-security-sysdig-falco/>.

Kaczorowski et al., "Exploring container security: Using Cloud Security Command Center (and five partner tools) to detect and manage an attack", May 3, 2018, 7 pages, <https://cloud.google.com/blog/products/gcp/exploring-container-security-using-cloud-security-comma>.

Martin, Andrew, "11 Ways (Not) to Get Hacked", Kubernetes Blog, Jul. 18, 2018, 9 pages, <https://kubernetes.io/blog/2018/07/18/11-ways-not-to-get-hacked/>.

Naik, Yathi, "Detecting Docker Exploits and Vulnerabilities—Your How-to Guide", Mar. 8, 2018, 15 pages, <https://www.stackrox.com/post/2018/03/breaking-bad-detecting-real-world-container-exploits/>.

Osnat, Rani, "Aqua 3.2: Preventing Container Breakouts with Dynamic System Call Profiling", Aug. 2, 2018, 8 pages, <https://blog.aquasec.com/aqua-3.2-preventing-container-breakouts-with-dynamic-system-call-profiling>.

Perez, Juan C., "Securing Container Deployments with Qualys", Aug. 30, 2018, 8 pages, <https://blog.qualys.com/product-tech/2018/08/30/securing-container-deployments-with-qualys>.

Tien et al., "KubAnomaly: Anomaly detection for the Docker orchestration platform with neural network approaches", Accepted: Nov. 22, 2019, 20 pages, <https://www.researchgate.net/publication/337920492>.

* cited by examiner

CLUSTERED CONTAINER PROTECTION

BACKGROUND

The present invention relates generally to the field of virtualization, and more particularly to cluster container protection.

Operating system (OS) virtualization refers to an operating system paradigm in which a kernel allows an existence of multiple isolated user-space instances. Such instances, called containers, zones, virtual private servers, partitions, virtual environments, virtual kernel, or jails, may look like real computers from the perspective of the contained programs. A computer program running on an ordinary operating system can see all resources (connected devices, files and folders, network shares, CPU power, quantifiable hardware capabilities) of that computer, however, programs running inside of a container can only see the contents of the container and devices assigned to the container. Operating-system-level virtualization is commonly used in virtual hosting environments for securely allocating finite hardware resources among a large number of independent users. System administrators may also virtualize for consolidating server hardware by moving services on separate hosts into containers on a single host (e.g., server). Containers are commonly used for improved security, hardware independence, and added resource management features. Operating-system-level virtualization implementations capable of live migration can also be used for dynamic load balancing of containers between nodes in a cluster. Operating-system-level virtualization usually imposes less overhead than full virtualization because programs in virtual partitions use a normal system call interface of the operating system and do not need to be subjected to emulation or be run in an intermediate virtual machine, as is the case with full virtualization and paravirtualization. This form of virtualization also does not require hardware support for efficient performance.

Operating-system-level virtualization is not as flexible as other virtualization approaches (e.g., containerization) since it cannot host a guest operating system different from the host one, or a different guest kernel. Some implementations provide file-level copy-on-write (CoW) mechanisms. Most commonly, a standard file system is shared between partitions, and those partitions that change the files automatically create copies. This is easier to back up, more space-efficient, and simpler to cache than the block-level copy-on-write schemes common on whole-system virtualization. Whole-system virtualization, however, can work with non-native file systems and create and roll back snapshots of the entire system state.

SUMMARY

Embodiments of the present invention disclose a computer-implemented method, a computer program product, and a system. The computer-implemented method includes one or more computer processers determining a runtime feature set for a first container, wherein the runtime feature set includes aggregated temporally collocated container behavior. The one or more computer processors cluster the first container with one or more peer containers or peer pods based on a shared container purpose, similar container behaviors, and similar container file structure. The one or more computer processors determine an additional runtime feature set for each peer container. The one or more computer processors calculate a variance between the first container and each peer container. The one or more computer processors, responsive to the calculated variance exceeding a variance threshold, identify the first container as anomalous.

DETAILED DESCRIPTION

The majority of modern companies and organizations containerize critical enterprise applications to support rapidly changing environments and system demands. This increased adoption of container technology has introduced new attack vectors for hackers or bad actors to exploit due to a lack of new container protection technologies and techniques. This issue is exacerbated by a lack of reliable and accessible malicious image signatures while bad actors are able to bypass existing malicious image signatures by modifying a container hash with very little effort or cost. In addition, many containers are created by a third party or vendor in a specific and controlled environment leading to increased difficulty in building reputation or behavior profiles for containers without identifying and determining correct context. Furthermore, third party container creation increases computational costs when identifying baselines for reputation or behavior container profiles. Current systems sample container behavior in fixed intervals, such as 24 hours, leading to increased security risks in that fixed interval while increasing computational overhead and delaying container deployments.

Embodiments of the present invention improve containers and container systems through the dynamic profiling of container runtime behaviors while maintaining a dynamic baseline from a selective subset of clustered containers. Embodiments of the present invention improve container availability, reliability, and stability by incorporating identified non-anomalous containers or pods into a replica set defined by a cluster of peer containers. Embodiments of the present invention improve container or pod security by identifying and mitigating irregular or anomalous containers or pods based on baseline deviation. Embodiments of the present invention reduce computational overhead of anomalous containers by only profiling peer containers or peer pods with a shared identified purpose. Implementation of embodiments of the invention may take a variety of forms, and exemplary implementation details are discussed subsequently with reference to the FIGS.

The present invention will now be described in detail with reference to the Figures.

Figure 1:
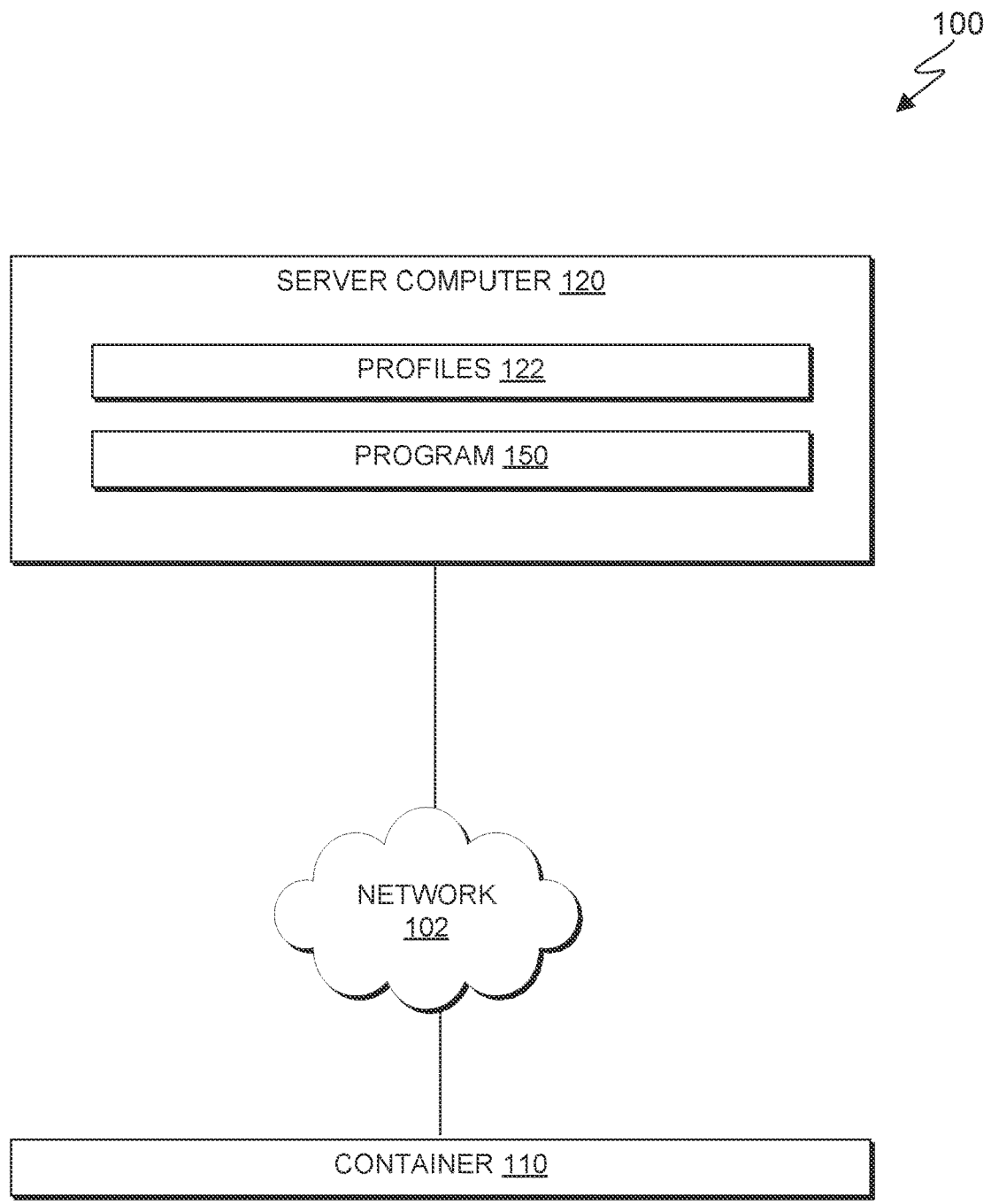
FIG. 1 (i.e., FIG.) is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes container 110 and server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between container 110, server computer 120, and other computing devices (not shown) within distributed data processing environment 100. In various embodiments, network 102 operates locally via wired, wireless, or optical connections and can be any combination of connections and protocols (e.g., personal area network (PAN), near field communication (NFC), laser, infrared, ultrasonic, etc.).

Container 110 is representative of a unit of software that packages up code and dependencies. For example, container 110 hosts a packaged web server. In an embodiment, container 110 is one of a plurality of containers comprised in a pod, where each container works together to complete a task (i.e., container purpose). For example, an example pod is comprised of a container containing a web server working with another container containing a load balancer. In another embodiment, container 110 may reside on server computer 120 or on another computing device (not shown) connected over network 102.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with container 110 and other computing devices (not shown) within distributed data processing environment 100 via network 102. In another embodiment, server computer 120 represents a computing system utilizing clustered computers and components (e.g., database server computers, application server computers, etc.) that act as a single pool of seamless resources when accessed within distributed data processing environment 100. In the depicted embodiment, server computer 120 includes profiles 122 and program 150. In other embodiments, server computer 120 may contain other applications, databases, programs, etc. which have not been depicted in distributed data processing environment 100. Server computer 120 may include internal and external hardware components, as depicted and described in further detail with respect to FIG. 3.

Profiles 122 is a repository for data used by program 150. In the depicted embodiment, profiles 122 resides on server computer 120. In another embodiment, profiles 122 may reside elsewhere within distributed data processing environment 100 provided program 150 has access to profiles 122. A database is an organized collection of profiling data. Profiles 122 can be implemented with any type of storage device capable of storing data and configuration files that can be accessed and utilized by program 150, such as a database server, a hard disk drive, or a flash memory. In an embodiment, profiles 122 stores data collected (i.e., runtime feature sets) by program 150 from one or more running containers, pods, clusters, or replica sets. In an embodiment, profiles 122 may include, but not limited to, historical baselines, and container behavior, such as system calls, accessed files, running processes, and communicated network entities.

Program 150 is a program for container protection through dynamic profiling. In various embodiments, program 150 may implement the following steps: determine a runtime feature set for a first container, wherein the runtime feature set includes aggregated temporally collocated container behavior; cluster the first container with one or more peer containers or peer pods based on a shared container purpose, similar container behaviors, and similar container file structure; determine an additional runtime feature set for each peer container; calculate a variance between the first container and each peer container; and responsive to the calculated variance exceeding a variance threshold, identify the first container as anomalous. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on container 110 and/or any other computing device (not depicted) within distributed data processing environment 100. Program 150 is depicted and described in further detail with respect to FIG. 2.

The present invention may contain various accessible data sources, such as profiles 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
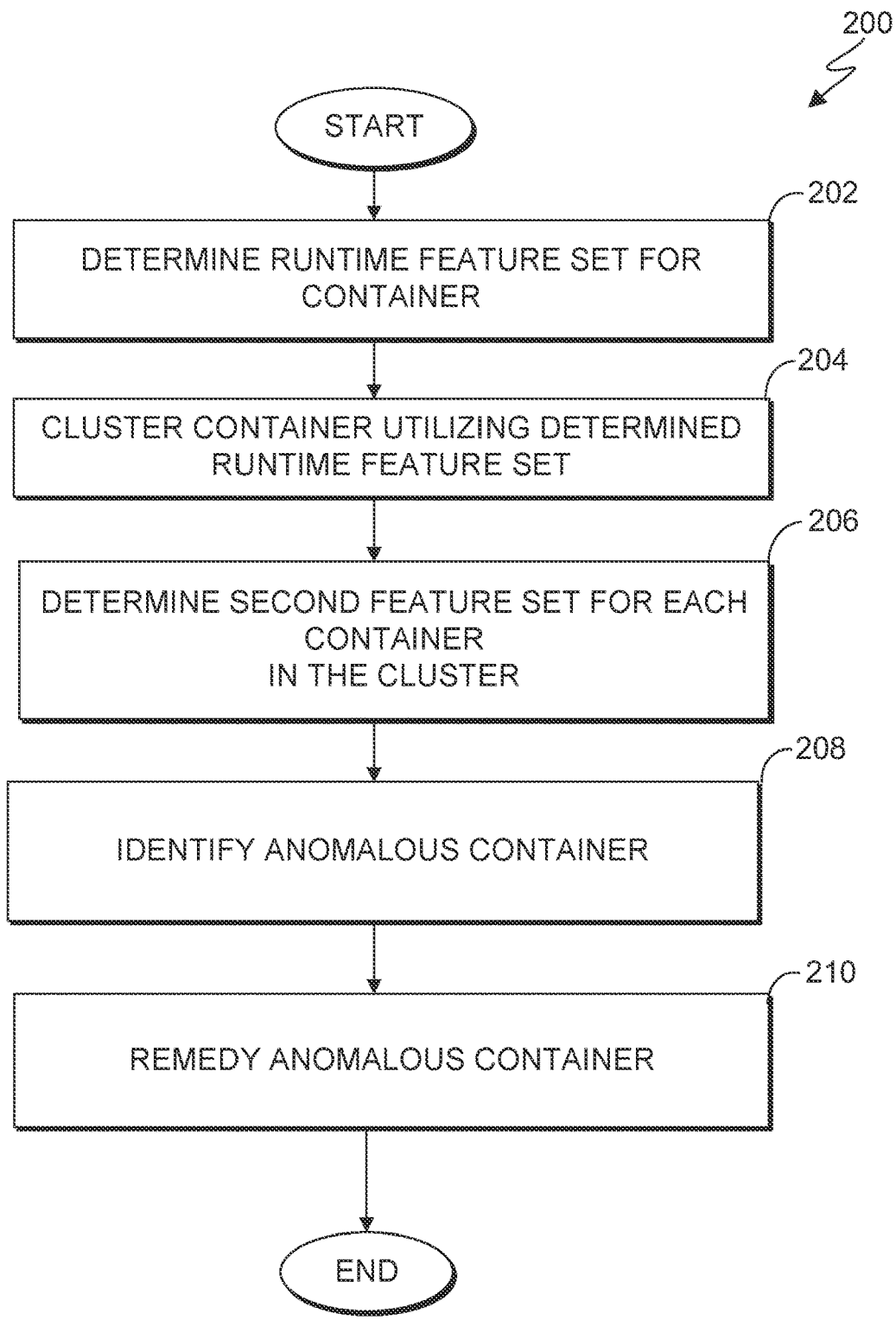
FIG. 2 is a flowchart depicting operational steps of a program, on a server computer within the data processing environment of FIG. 1, for container protection through dynamic profiling, in accordance with an embodiment of the present invention.

FIG. 2 depicts flowchart 200 illustrating operational steps of program 150 for container protection through dynamic profiling, in accordance with an embodiment of the present invention.

Program 150 determines a runtime feature set for a container (step 202). In an embodiment, program 150 initiates responsive to start of one or more containers (i.e., first container) or the introduction of a replica group. In another embodiment, program 150 initiates responsive to an event or user request for protection on a container, cluster, or replica set. Program 150 monitors the first container for system calls, accessed files, running processes, and communicated network entities. In an embodiment, program 150 encodes the representation of container activities into a compact format that records how a container interacts within a respective context (e.g., environment, configuration parameters, environmental variables, etc.). In this embodiment, program 150 connects container behaviors (e.g., file, network, process operations) to network and file access activities while providing a container context. In a further embodiment, program 150 records the types and number of system calls, touched files, process numbers, child process numbers, number of open or listening ports, number of inbound networks, number of outbound connections.

In an embodiment, program 150 aggregates temporally collocated container behavior as a single correlated item called flow. For example, program 150 identifies a file open-write-close that finished within a five minute period and aggregates this behavior with another file flow (e.g., file open, read/write/truncate, file close), and network flow (e.g., connection creation, send/receive, connection close) within the five minute period. In another embodiment, program 150 collects general container information such as number of input/output (I/O), access to/proc, number of sent user datagram protocol (UDP) packets, etc. In an embodiment, program 150 collects pod behaviors when the monitored container is enclosed in a collaborative pod of interworking pod containers. In this embodiment, pod behaviors are aggregated with temporally collocated container behaviors from each container in the pod. In another embodiment, program 150 collects container metadata such as environmental variables or configurations of the containers, related replica sets, or the name and tag of associated source images.

Program 150 clusters the container utilizing determined runtime feature set (step 204). Program 150 matches and clusters the determined container with similar (i.e., peer) containers or pods. In an embodiment, a user provides a container or pod purpose. In another embodiment, program 150 identifies the purpose of the first container or first pod utilizing the determined runtime feature set, as described in step 202. For example, program 150 records a significant amount of container network data transferred on port 80 and determines that the container is a webserver based on historical or known containers (i.e., the purpose of the container is known). In another embodiment, program 150 identifies all the folders and files contained within the container and compares identified file and folder information and metadata with information and metadata associated with potential peer containers (e.g., historical containers, containers running in different environments or localities, publicly run containers, etc.). In this embodiment, program 150 may compare any combination of the following attributes: filenames, folder names, parent folders, subfolders, associated permissions, creation dates, modified dates, symbolic links, file sizes, folder sizes, and file types, to determine the purpose of the container as compared to historical containers, where the container purpose is known for historical containers. In an embodiment, program 150 utilizes the compared peer container filesystems to calculate a similarity score, where higher similarity scores indicate a higher probability of a shared purpose. In an embodiment, program 150 clusters the first container or first pod based on an identified container or pod purpose. In an embodiment, program 150 utilizes one or more clustering algorithms to cluster the first container to a plurality of peer containers. In a further embodiment, program 150 utilizes density-based spatial clustering of applications with noise (DBSCAN) to cluster the container with similarly (e.g., exceeding a similarity threshold) behaving containers or pods. In another embodiment, program 150 clusters the container or pod with peer containers or peer pods in a replica set.

Program 150 determines a second runtime feature set for each peer container in the container cluster (step 206). Program 150 performs the methods and techniques discussed in step 202 on each container or pod in the container cluster as described in step 204. In an embodiment, program 150 is attached to each container or pod in the cluster of peer containers and dynamically profiles each container or pod. In an embodiment, program 150 removes peer containers that, at least initially, deviate from the cluster (e.g., average or within a specific interval). In a further embodiment, program 150 aggregates temporally collocated cluster behavior based on aggregated second runtime feature sets. In an embodiment, program 150 derives a baseline (i.e., profile) runtime feature set based on the aggregated second runtime feature sets in a specific temporal period, for example, the average aggregated network traffic within a ten minute period. In this embodiment, the baseline runtime feature set represents normal or healthy operation of a container or pod. In these embodiments, program 150 continues to record runtime feature sets from each peer container and dynamically adjusts the baseline responsive to the newly recorded runtime feature sets. This embodiment allows program 150 to dynamically adjust the baseline despite any limitations associated with sampling rate or sampling intervals. In this embodiment, program 150 adjusts the baseline responsive to one or more determined runtime feature sets.

Program 150 identifies an anomalous container (step 208). Program 150 continuously records runtime feature sets from the first container and from each peer container in the cluster. In an embodiment, program 150 continuously compares the runtime feature sets from the first container with peer containers in an encompassing cluster. In this embodiment, program 150 detects and identifies anomalous container behaviors such that security vulnerabilities (e.g., zero-day attack) are discovered and mitigated. In an embodiment, program 150 calculates or derives a variance or deviation value (e.g., square distance from cluster average) between each peer container (i.e., baseline) and the first container. In another embodiment, the variance value is calculated from a percentage vector of each type of system calls, number of aggregated flows, observed predefined items over predefined time intervals, number of touched files, number of created files, and number of network connections or connected clients. In an embodiment, program 150 identifies the first container or any peer container as anomalous if the respective variance value or deviation exceeds a predefined threshold. In an embodiment, program 150 adjusts the threshold based on the identified container purpose, where program 150 decreases the threshold in response to an identified critical container purpose, such as a primary customer database.

Program 150 remedies the identified anomalous container (step 210). Program 150 initiates one or more remedies or mitigating actions in response to an identified anomalous container. In an embodiment, program 150 utilizes container orchestration systems to recover or replace the anomalous containers with replica containers contained in an associated replica set. In this embodiment, a new container is created to replace the anomalous container without interruption to the environment. In an embodiment, program 150 calculates a container runtime risk level based on the level of variance or deviation as compared to the significance of the container purpose or a level of enterprise criticality (e.g., significance or effect of the container to a business process, replica set, and/or pod). In an embodiment, program 150 utilizes the runtime risk level to adjust variance thresholds, similarity thresholds and variance frequency thresholds, where riskier containers have reduced thresholds (i.e., thresholds are trigger more frequently). In an embodiment, program 150 establishes a variance frequency threshold allowing a container to deviate one or more times until the deviations exceed the frequency threshold. In this embodiment, program 150 adjusts the variance frequency threshold based on container purpose. In another embodiment, if an anomaly repeats within a specified temporal period within a plurality of peer containers or replica sets, program 150 adjusts said threshold to reduce the anomalous repetitions.

In an embodiment, program 150 implements security practices on the anomalous container such as downgrading to a non-privileged user, limiting resource usage, sandboxing critical processes, limiting volume mounts, and binding privileged ports. In another embodiment, program 150 converts the anomalous container into a honeypot, allowing program 150 to discover or identify information regarding the origin and purpose of the anomalous container. In another embodiment, program 150 automatically deploys the anomalous container to a sandbox host or sandbox cluster of hosts (e.g., removed access to critical systems, read-only environment, increased backup rate, etc.). In an embodiment, program 150 trains a model (i.e., neural network) with the determined runtime feature sets and identified anomalous containers. In this embodiment, program 150 utilizes the trained model to identify future anomalous containers as the trained model is fed with continuous runtime feature sets. In an embodiment, program 150 replaces any identified anomalous containers in a replica set with one or more peer containers, wherein servable assets of the anomalous container are transferred to one or more peer containers while maintaining the structure and configuration of the one or more peer containers.

Figure 3:
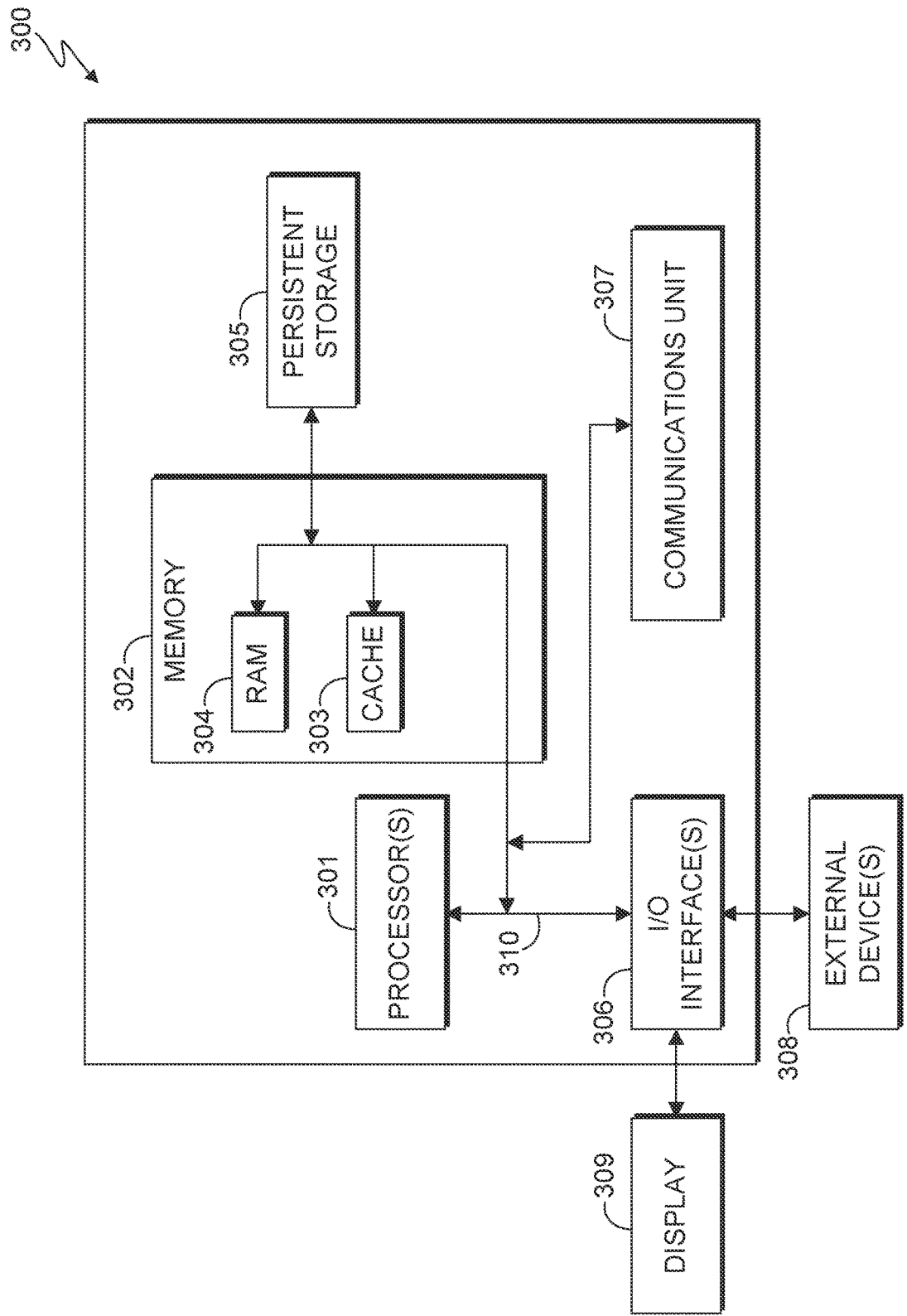
FIG. 3 is a block diagram of components of a computing device and the server computer, in accordance with an embodiment of the present invention.

FIG. 3 depicts block diagram 300 illustrating components of server computer 120 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server computer 120 includes communications fabric 304, which provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications, and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of computer processor(s) 301 by holding recently accessed data, and data near accessed data, from memory 302.

Program 150 may be stored in persistent storage 305 and in memory 302 for execution by one or more of the respective computer processor(s) 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data can be stored in persistent storage 305 for access and/or execution by one or more of the respective processors 301 via cache 303.

Communications unit 307, in these examples, provides for communications with other data processing systems or devices. In these examples, communications unit 307 includes one or more network interface cards. Communications unit 307 may provide communications through the use of either or both physical and wireless communications links. Program 150 may be downloaded to persistent storage 305 through communications unit 307.

I/O interface(s) 306 allows for input and output of data with other devices that may be connected, respectively, to server computer 120. For example, I/O interface(s) 306 may provide a connection to external device(s) 308, such as a keyboard, a keypad, a touch screen, and/or some other suitable input device. External devices 308 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 305 via I/O interface(s) 306. I/O interface(s) 306 also connect to a display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   determining, by one or more computer processors, a runtime feature set for a first container, wherein the runtime feature set includes aggregated temporally collocated container behavior;
   determining, by one or more computer processors, a purpose associated with the first container based on the determined runtime feature set;
   clustering, by one or more computer processors, the first container with one or more peer containers identified through a shared purpose and compared filesystems;
   attaching, by one or more computer processors, to the one or more clustered peer containers;
   determining, by one or more computer processors, an additional runtime feature set for each attached peer container;
   calculating, by one or more computer processors, a variance between the first container and each attached peer container;
   responsive to the calculated variance exceeding a variance threshold, identifying, by one or more computer processors, the first container as anomalous; and
   responsive to the first container identified as anomalous, removing, by one or more computer processors, the first container.

2. The computer-implemented method of claim 1, wherein calculating the variance between the first container and each peer container, further comprises:
   creating, by one or more computer processors, a baseline run runtime feature set based on aggregated additional runtime feature sets from the clustered peer containers in a temporal period.

3. The computer-implemented method of claim 1, wherein the runtime feature set is selected from the group consisting of file operations, network operations, and process operations.

4. The computer-implemented method of claim 1, further comprising:
   comparing, by one or more computer processors, filenames, folder names, parent folders, subfolders, associated permissions, creation dates, modified dates, symbolic links, file sizes, folder sizes, and file types of the first container and one or more known containers to determine the container purpose of the first container.

5. The computer-implemented method of claim 1, wherein the variance is derived from a percentage vector of system calls, a number of aggregated collocated container behavior, a number of touched files, a number of created files, and a number of network connections.

6. The computer-implemented method of claim 1, further comprising:
   adding, by one or more computer processors, the first container to a replica set comprising the clustered peer containers.

7. The computer-implemented method of claim 1, further comprising:
   adjusting, by one or more computer processors, the variance threshold based on the determined purpose associated with the first container and level of enterprise criticality associated with the first container.

8. A computer program product comprising:
   one or more computer readable storage media and program instructions stored on the one or more computer readable storage media, the stored program instructions comprising:
   program instructions to determine a runtime feature set for a first container, wherein the runtime feature set includes aggregated temporally collocated container behavior;
   program instructions to determine a purpose associated with the first container based on the determined runtime feature set;
   program instructions to cluster the first container with one or more peer containers identified through a shared purpose and compared filesystems;
   program instructions to attach to the one or more clustered peer containers;
   program instructions to determine an additional runtime feature set for each peer container;
   program instructions to calculate a variance between the first container and each peer container;
   program instructions to, responsive to the calculated variance exceeding a variance threshold, identify the first container as anomalous; and
   program instructions to responsive to the first container identified as anomalous, remove the first container.

9. The computer program product of claim 8, wherein the program instructions, to calculate the variance between the first container and each peer container, comprise:
   program instructions to create a baseline run runtime feature set based on aggregated additional runtime feature sets from the clustered peer containers in a temporal period.

10. The computer program product of claim 8, wherein the runtime feature set is selected from the group consisting of file operations, network operations, and process operations.

11. The computer program product of claim 8, wherein the program instructions further comprise:
    program instructions to compare filenames, folder names, parent folders, subfolders, associated permissions, creation dates, modified dates, symbolic links, file sizes, folder sizes, and file types of the first container and one or more known containers to determine the container purpose of the first container.

12. The computer program product of claim 8, wherein the variance is derived from a percentage vector of system calls, a number of aggregated collocated container behavior, a number of touched files, a number of created files, and a number of network connections.

13. The computer program product of claim 8, wherein the program instructions, stored on the one or more computer readable storage media, further comprise:
    program instructions to add the first container to a replica set comprising the clustered peer containers.

14. The computer program product of claim 8, wherein the program instructions, stored on the one or more computer readable storage media, further comprise:
    program instructions to adjust the variance threshold based on the determined purpose associated with the first container and level of enterprise criticality associated with the first container.

15. A computer system comprising:
    one or more computer processors;
    one or more computer readable storage media; and program instructions stored on the computer readable storage media for execution by at least one of the one or more processors, the stored program instructions comprising:

program instructions to determine a runtime feature set for a first container, wherein the runtime feature set includes aggregated temporally collocated container behavior;

program instructions to determine a purpose associated with the first container based on the determined runtime feature set;

program instructions to cluster the first container with one or more peer containers identified through a shared purpose and compared filesystems;

program instructions to attach to the one or more clustered peer containers;

program instructions to determine an additional runtime feature set for each peer container;

program instructions to calculate a variance between the first container and each peer container;

program instructions to, responsive to the calculated variance exceeding a variance threshold, identify the first container as anomalous; and program instructions to responsive to the first container identified as anomalous, remove the first container.

16. The computer system of claim 15, wherein the program instructions, to calculate the variance between the first container and each peer container, comprise:

program instructions to create a baseline run runtime feature set based on aggregated additional runtime feature sets from the clustered peer containers in a temporal period.

17. The computer system of claim 15, wherein the runtime feature set is selected from the group consisting of file operations, network operations, and process operations.

18. The computer system of claim 15, wherein the program instructions further comprise:

program instructions to compare filenames, folder names, parent folders, subfolders, associated permissions, creation dates, modified dates, symbolic links, file sizes, folder sizes, and file types of the first container and one or more known containers to determine the container purpose of the first container.

19. The computer system of claim 15, wherein the variance is derived from a percentage vector of system calls, a number of aggregated collocated container behavior, a number of touched files, a number of created files, and a number of network connections.

20. The computer system of claim 15, wherein the program instructions, stored on the one or more computer readable storage media, further comprise:

program instructions to adjust the variance threshold based on the determined purpose associated with the first container and level of enterprise criticality associated with the first container.

* * * * *